United States Patent
Rupley (10) Patent No.: US 9,626,190 B2
(45) Date of Patent: Apr. 18, 2017

(54) METHOD AND APPARATUS FOR FLOATING POINT REGISTER CACHING

(75) Inventor: Jeff Rupley, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1685 days.

(21) Appl. No.: 12/900,124

(22) Filed: Oct. 7, 2010

(65) Prior Publication Data

US 2012/0089807 A1  Apr. 12, 2012

(51) Int. Cl.
*G06F 9/38* (2006.01)
*G06F 9/30* (2006.01)

(52) U.S. Cl.
CPC .......... *G06F 9/384* (2013.01); *G06F 9/3013* (2013.01)

(58) Field of Classification Search
USPC .......... 711/100, 122, 125, 202, E12.016, 711/E12.017, E12.024; 712/209, 222, 712/225, 324; 717/141
See application file for complete search history.

(56) References Cited

U.S. PATENT DOCUMENTS

| | | | |
|---|---|---|---|
| 6,237,076 B1 | 5/2001 | Gaertner et al. | 712/23 |
| 6,425,072 B1 | 7/2002 | Meier et al. | |
| 8,140,780 B2* | 3/2012 | Noyes | 711/156 |
| 8,707,015 B2 | 4/2014 | Rupley et al. | |
| 2003/0191924 A1* | 10/2003 | Weaver | 712/217 |
| 2004/0015904 A1* | 1/2004 | Jourdan et al. | 717/141 |
| 2007/0162726 A1* | 7/2007 | Gschwind et al. | 712/209 |
| 2008/0162898 A1* | 7/2008 | Gschwind | 712/225 |
| 2010/0199074 A1 | 8/2010 | Gemmeke et al. | |
| 2013/0145127 A1 | 6/2013 | Hardage et al. | |

OTHER PUBLICATIONS

International PCT PCT/US2011/054688 Search Report and Written Opinion dated Jan. 6, 2012.
Butts et al., "Use-Based Register Caching with Decoupled Indexing" XP002665885, 31$^{st}$ International Symposium on Computer Architecture (ISCA-31) Jun. 2004.
U.S. Appl. No. 13/667,354, filed Nov. 2, 2012, entitled "Tracking and Reclaiming Physical Registers"
Masaaki Kondo et al., "A Small, Fast and Low-Power Register File by Bit-Partitioning", 11th International Symposium on High Performance Computer Architecture, Feb. 1, 2005, 10 pages.
Alan Pita et al., "Sectored Renaming for Superscalar Microprocessors", 1999 IEEE International Performance, Computing and Communications Conference, Feb. 10, 1999, 6 pages.

* cited by examiner

*Primary Examiner* — Zhuo Li (57) ABSTRACT

The present invention provides a method and apparatus for floating-point register caching. One embodiment of the method includes mapping a first set of architected registers defined by a first instruction set to a memory outside of a plurality of physical registers. The plurality of physical registers are configured to map to the first set, a second set of architected registers defined by a second construction set, and a set of rename registers. This embodiment of the method also includes adding the physical registers corresponding to the first set of architected registers to the set of rename registers.

20 Claims, 4 Drawing Sheets

METHOD AND APPARATUS FOR FLOATING POINT REGISTER CACHING

BACKGROUND OF THE INVENTION

1. Field of the Invention

This invention relates generally to processor-based systems, and, more particularly, to register caching in processor-based systems.

2. Description of the Related Art

Conventional processor-based systems typically include one or more processing elements such as a central processing unit (CPU), a graphical processing unit (GPU), an accelerated processing unit (APU), and the like. The processing units include one or more processor cores that are configured to access instructions and/or data that are stored in a main memory and then execute the instructions and/or manipulate the data. Each processor core includes a floating point unit that is used to perform mathematical operations on floating point numbers when required by the executed instructions. For example, conventional floating-point units are typically designed to carry out operations such as addition, subtraction, multiplication, division, and square root. Some systems can also perform various transcendental functions such as exponential or trigonometric calculations. Floating-point operations may be handled separately from integer operations on integer numbers. The floating-point unit may also have a set of dedicated floating-point registers for storing floating-point numbers.

Floating-point units can support multiple floating-point instruction sets. For example, the x86 architecture instruction set includes a floating-point related subset of instructions that is referred to as x87. The x87 instruction set includes instructions for basic floating point operations such as addition, subtraction and comparison, as well as for more complex numerical operations such as the tangent and arc-tangent functions. Floating-point instructions in the x87 instruction set can use a set of architected registers (conventionally known as MMX registers) that can be mapped to physical registers in the floating-point unit. For another example, computers that include multiple processing cores may support a single instruction, multiple data (SIMD) instruction set. The x86 architecture SIMD instruction set supports another floating-point related subset of instructions that are referred to as Streaming SIMD Extensions (SSE). Floating-point instructions in the SSE instruction set can use another set of architected registers (conventionally known as XMM registers) that can also be mapped to physical registers in the floating-point unit.

Different applications running on the processing unit can therefore use the x87 floating-point instruction set, the SSE floating-point instruction set, or a mixture of the two instruction sets. Consequently, architected registers for both instruction sets are mapped to physical registers in the floating-point unit so that both sets of architected registers are available to the applications running on the processing unit. Mapping architected registers for both instruction sets to physical registers in the floating-point unit consumes area on the chip, timing resources, and power. Depending on the instruction sets used by different applications, the resources that are allocated to the different types of instruction sets may not be used, thereby reducing the efficiency of the processing unit.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for floating-point register caching. One embodiment of the method includes mapping a first set of architected registers defined by a first instruction set to a memory outside of a plurality of physical registers. The plurality of physical registers are configured to map to the first set, a second set of architected registers defined by a second construction set, and a set of rename registers. This embodiment of the method also includes adding the physical registers corresponding to the first set of architected registers to the set of rename registers.

In another embodiment, an apparatus is provided for floating-point register caching. One embodiment of the apparatus includes a plurality of physical registers configured to be mapped to a first set of architected registers defined by a first instruction set, a second set of architected registers defined by a second instruction set, and a set of rename registers. The first set of architected registers can be mapped to a memory outside the physical registers so that the corresponding physical registers can be added to the set of rename registers.

Another embodiment includes a computer readable media including instructions that when executed can configure a manufacturing process used to manufacture a semiconductor device that can be used for floating-point register caching. The manufactured semiconductor device includes a plurality of physical registers configured to be mapped to a first set of architected registers defined by a first instruction set, a second set of architected registers defined by a second instruction set, and a set of rename registers. The first set of architected registers can be mapped to a memory outside the physical registers so that the corresponding physical registers can be added to the set of rename registers.

In yet another embodiment, an apparatus is provided for floating-point register caching. One embodiment of the apparatus includes a floating point unit configured to perform mathematical operations on floating point numbers and a plurality of physical registers implemented in the floating point unit and configured to store floating-point numbers. This embodiment of the apparatus also includes a memory outside of the physical registers. The memory is configured to store floating-point numbers. A first set of architected registers defined by a first instruction set, a second set of architected registers defined by a second instruction set, and a set of rename registers can be mapped to the plurality of physical registers. The first set of architected registers can also be mapped to the memory outside the physical registers so that the corresponding physical registers can be added to the set of rename registers.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of a processor-based system that can execute instructions from multiple floating-point instruction sets. For example, the system may be able to execute instructions from the x87 floating-point instruction set and instructions from the SSE floating-point instruction set. Each instruction set is allocated a number of architected registers that can be used by the instructions when performing various floating-point operations. The architected registers may be mapped to a set of physical registers implemented in or used by the processor-based system. The physical registers may also include rename registers that can be used to rename one or more of the architected registers so that multiple instructions can be executed in parallel (e.g., concurrently) even though the instructions may refer to the same architected register. However, most of the time applications and/or code that are executing in the processor-based system use either one instruction set or the other instruction set. Only rarely does a single application use a mixture of the two floating-point instruction sets. The architected registers associated with either of the instruction sets (preferably the instruction set that is expected to be used the least) can be offloaded to an outside memory such as a cache or other register structure. The physical registers that are associated with the offloaded architected registers can then be added to the set of rename registers.

Figure 1:
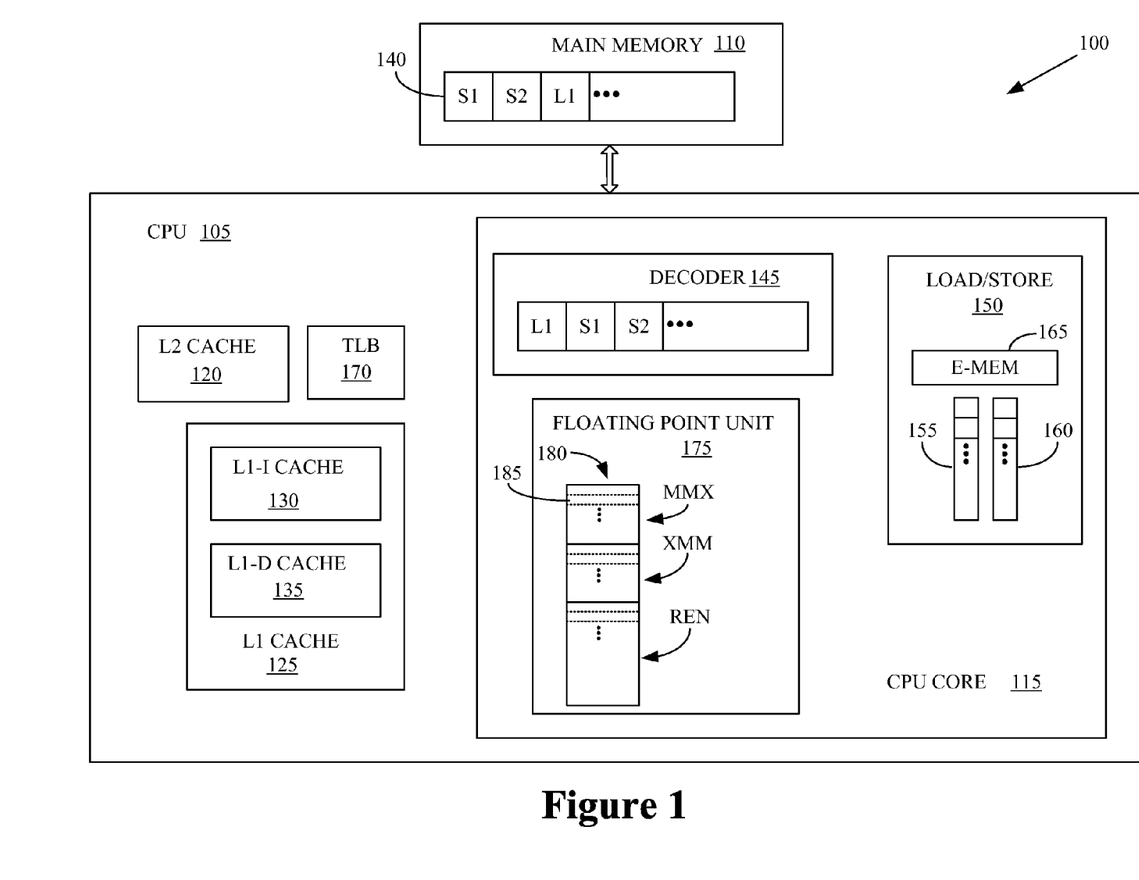
FIG. 1 conceptually illustrates a first exemplary embodiment of a semiconductor device.

FIG. 1 conceptually illustrates a first exemplary embodiment of a semiconductor device 100 that may be formed in or on a semiconductor wafer (or die). The semiconductor device 100 may formed in or on the semiconductor wafer using well known processes such as deposition, growth, photolithography, etching, planarising, polishing, annealing, and the like. In the illustrated embodiment, the device 100 includes a central processing unit (CPU) 105 that is configured to access instructions and/or data that are stored in the main memory 110. In the illustrated embodiment, the CPU 105 includes at least one CPU core 115 that is used to execute the instructions and/or manipulate the data. Many processor-based systems include multiple CPU cores 115. The CPU 105 also implements a hierarchical (or multilevel) cache system that is used to speed access to the instructions and/or data by storing selected instructions and/or data in the caches. However, persons of ordinary skill in the art having benefit of the present disclosure should appreciate that alternative embodiments of the device 100 may implement different configurations of the CPU 105, such as configurations that use external caches. Moreover, the techniques described in the present application may be applied to other processors such as graphical processing units (GPUs), accelerated processing units (APUs), and the like.

The illustrated cache system includes a level 2 (L2) cache 120 for storing copies of instructions and/or data that are stored in the main memory 110. In the illustrated embodiment, the L2 cache 120 is 16-way associative to the main memory 110 so that each line in the main memory 110 can potentially be copied to and from 16 particular lines (which are conventionally referred to as "ways") in the L2 cache 120. However, persons of ordinary skill in the art having benefit of the present disclosure should appreciate that alternative embodiments of the main memory 110 and/or the L2 cache 120 can be implemented using any associativity. Relative to the main memory 110, the L2 cache 120 may be implemented using smaller and faster memory elements. The L2 cache 120 may also be deployed logically and/or physically closer to the CPU core 115 (relative to the main memory 110) so that information may be exchanged between the CPU core 115 and the L2 cache 120 more rapidly and/or with less latency.

The illustrated cache system also includes an L1 cache 125 for storing copies of instructions and/or data that are stored in the main memory 110 and/or the L2 cache 120. Relative to the L2 cache 120, the L1 cache 125 may be implemented using smaller and faster memory elements so that information stored in the lines of the L1 cache 125 can be retrieved quickly by the CPU 105. The L1 cache 125 may also be deployed logically and/or physically closer to the CPU core 110 (relative to the main memory 110 and the L2 cache 120) so that information may be exchanged between the CPU core 115 and the L1 cache 125 more rapidly and/or with less latency (relative to communication with the main memory 110 and the L2 cache 120). Persons of ordinary skill in the art having benefit of the present disclosure should appreciate that the L1 cache 125 and the L2 cache 120 represent one exemplary embodiment of a multi-level hierarchical cache memory system. Alternative embodiments may use different multilevel caches including elements such as L0 caches, L1 caches, L2 caches, L3 caches, and the like.

In the illustrated embodiment, the L1 cache 125 is separated into level 1 (L1) caches for storing instructions and data, which are referred to as the L1-I cache 130 and the L1-D cache 135. Separating or partitioning the L1 cache 125 into an L1-I cache 130 for storing only instructions and an L1-D cache 135 for storing only data may allow these caches to be deployed closer to the entities that are likely to request instructions and/or data, respectively. Consequently, this arrangement may reduce contention, wire delays, and generally decrease latency associated with instructions and data. In one embodiment, a replacement policy dictates that the lines in the L1-I cache 130 are replaced with instructions from the L2 cache 120 and the lines in the L1-D cache 135 are replaced with data from the L2 cache 120. However, persons of ordinary skill in the art should appreciate that alternative embodiments of the L1 cache 125 may not be partitioned into separate instruction-only and data-only caches 130, 135. The caches 120, 125, 130, 135 can be flushed by writing back modified (or "dirty") cache lines to the main memory 110 and invalidating other lines in the caches 120, 125, 130, 135. Cache flushing may be required for some instructions performed by the CPU 105, such as a RESET or a write-back-invalidate (WBINVD) instruction.

Processor-based systems utilize two basic memory access instructions: a store that puts (or stores) information in a memory location such as a register and a load that reads information out of a memory location. The CPU core 115 can execute programs that are formed using instructions such as loads and stores. In the illustrated embodiment, programs are stored in the main memory 110 and the instructions are kept in program order, which indicates the logical order for execution of the instructions so that the program operates correctly. For example, the main memory 110 may store instructions for a program 140 that includes the stores S1, S2 and the load L1 in program order. Persons of ordinary skill in the art having benefit of the present disclosure should appreciate that the program 140 may also include other instructions that may be performed earlier or later in the program order of the program 140.

The illustrated embodiment of the CPU core 115 includes a decoder 145 that selects and decodes program instructions so that they can be executed by the CPU core 115. In the illustrated embodiment, the CPU core 115 is an out-of-order processor that can execute instructions in an order that differs from the program order of the instructions in the associated program. For example, the decoder 145 may select and/or decode instructions from the program 140 in the order L1, S1, S2, which differs from the program order of the program 140 because the load L1 is picked before the stores S1, S2. The decoder 145 can dispatch, send, or provide the decoded instructions to a load/store unit 150. In the illustrated embodiment, the load/store unit 150 implements one or more store and/or load queues 155, 160 that are used to hold the stores and associated data. In one embodiment, the load/store unit 150 may also implement an emulated memory (E-MEM) 165 that can emulate or imitate operations of other memory elements in the system 100.

The store queues 155 shown in the illustrated embodiment are used to hold the stores and associated data. The data location for each store is indicated by a linear address, which may be translated into a physical address by the CPU core 115 so that data can be accessed from the main memory 110 and/or one of the caches 120, 125, 130, 135. The CPU core 115 may therefore be electronically and/or communicatively coupled to a translation look aside buffer (TLB) 170 that holds information that is used to translate linear addresses into physical addresses. When a store (such as S1 or S2) is picked, the store checks the TLB 170 and/or the data caches 120, 125, 130, 135 for the data used by the store. The store is then placed in the store queue 155 to wait for data. The load queues 160 shown in the illustrated embodiment are used to hold the loads and associated data. Load data may also be indicated by linear addresses and so the CPU core 115 may translate the linear addresses for load data into a physical address using information stored in the TLB 170. In the illustrated embodiment, when a load (such as L1) is picked, the load checks the TLB 170 and/or the data caches 120, 125, 130, 135 for the data used by the load. The load can also use the physical address to check the store queue 155 for address matches. Alternatively, linear addresses can be used to check the store queue 155 for address matches. If an address (linear or physical depending on the embodiment) in the store queue 155 matches the address of the data used by the load, then store-to-load forwarding can be used to forward the data from the store queue 155 to the load in the load queue 160.

The CPU core 115 may also implement other functional elements. In the illustrated embodiment, the CPU core 115 includes a floating point unit 175 that is used to perform mathematical operations on floating point numbers when required by the executed instructions. For example, the floating-point unit 175 may be designed to carry out operations such as addition, subtraction, multiplication, division, and square root. Alternative embodiments of the floating-point unit 175 may also perform various transcendental functions such as exponential or trigonometric calculations. The floating-point unit 175 implements a register structure 180 that includes a plurality of physical registers 185 (only one indicated by a distinguishing numeral) that are used to hold floating-point numbers. The physical registers 185 can be mapped to architected registers associated with or defined by different floating-point instruction sets. In the illustrated embodiment, one portion of the physical registers 185 can be mapped to architected registers (MMX) defined by the x87 floating-point instruction set and another portion of the physical registers 185 can be mapped to architected registers (XMM) defined by the SSE floating-point instruction set. The remaining portion of the physical registers 185 can be used as rename registers (REN), e.g., for supporting parallel and/or concurrent execution of instructions in an out-of-order processing environment.

In one embodiment, a first set of architected registers defined by a first instruction set (e.g., the architected registers (MMX) defined by the x87 floating-point instruction set) may be mapped to a memory location that is outside the physical registers 185, such as one or more of the caches 120, 125, 130, 135 or the emulated memory 165. The physical registers 185 corresponding to the first set of architected registers can then be added to the set of rename registers. Mapping some of the architected registers to memory locations outside of the physical registers 185 therefore frees up additional registers for use as rename registers. The additional rename registers allow the system to use additional renames, which can increase the parallelism of the environment by allowing additional instructions to be executed concurrently. Increasing the number of renames may therefore increase the out-of-order window and improve the performance of the system 100.

Figure 2A:
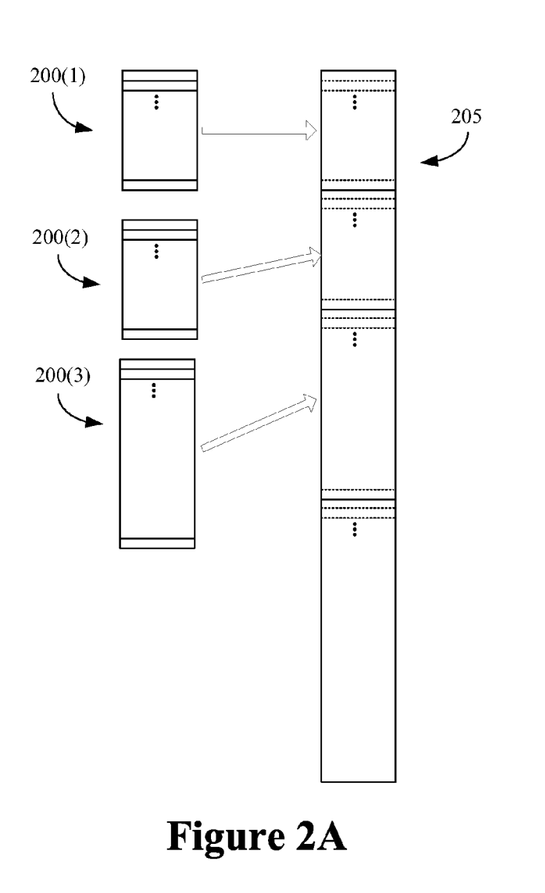
FIG. 2A conceptually illustrates a first exemplary embodiment of a mapping of architected registers to physical registers.

FIG. 2A conceptually illustrates a first exemplary embodiment of a mapping of architected registers 200(1-3) to physical registers 205. In the illustrated embodiment, the architected registers 200 include architected registers 200(1) defined for the x87 floating-point instruction set, architected registers 200(2) that are allocated as temporary registers for microcode, and architected registers 200(3) defined for the SSE floating-point instruction set. For example, the architected registers 200 may be defined are configured to provide eight architected registers 200(1), eight architected registers 200(2), and 32 architected registers 200(3). In the illustrated embodiment, the physical registers 205 include entries that can be mapped to the architected registers 200 and/or used as a rename registers, as indicated by the block arrows. For example, the physical registers 205 may include 88 entries so that 48 entries can be mapped to the architected registers 200 and the other 40 entries can be used as rename registers. However, the number of the architected registers 200 and/or the number of physical registers 205 is a matter of design choice and may be different in alternative embodiments.

Figure 2B:
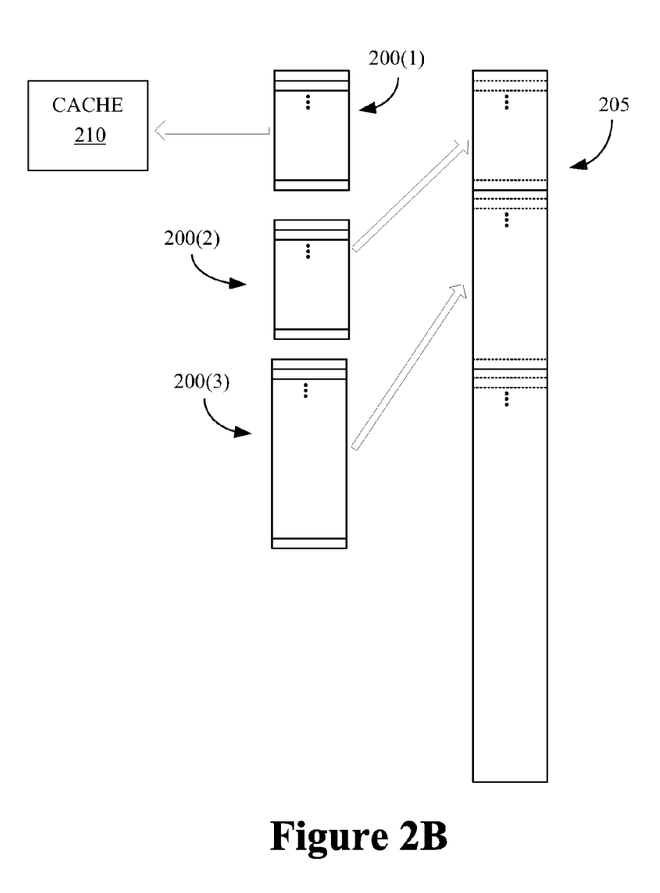
FIG. 2B conceptually illustrates a second exemplary embodiment of a mapping of architected registers to physical registers and a cache.

FIG. 2B conceptually illustrates a second exemplary embodiment of a mapping of architected registers to physical registers and a cache. In the illustrated embodiment, a portion of the architected registers 200 are mapped to memory and/or register structures that are located outside of the physical registers 205. For example, a portion of the architected registers 200 may be mapped to a cache 210. As discussed herein, the outside memory may include various caches implemented in the processor system, emulated memory, and the like. In alternative embodiments, a portion of the architected registers 200 that are mapped to the cache 210 may include some or all of the architected registers 200 associated with a particular instruction set. For example, as shown in FIG. 2B, the architected registers 200(1) defined for the x87 floating-point instruction set can be mapped to the cache 210. However, persons of ordinary skill in the art having benefit of the present disclosure should appreciate that this mapping is intended to be illustrative. In alternative embodiments, architected registers 200 associated with different instruction sets can be mapped to the cache 210. Moreover, a portion of one or more of the architected registers 200 that includes less than all of the entries associated with a particular instruction set can be mapped to the cache 210.

The first and second exemplary embodiments of the register mapping shown in FIGS. 2A and 2B may represent two states of the architected registers 200, the physical registers 205, and the cache 210. In one embodiment, the processor system may be initialized into either one of these states, e.g., depending on the expected demand usage associated with the different registers and/or instruction sets. Furthermore, in some embodiments the processor system may transition between these two states dynamically. For example, the system may be initialized into the state illustrated in FIG. 2B so that additional rename registers are available when demand usage for the x87 instruction set associated with the architected registers 200(1) is expected to be small. However, if the processor system determines that demand usage for the x87 floating-point instructions has increased, the mapping of the architected registers 200 can be changed so that the system shifts into the state illustrated in FIG. 2A.

Persons of ordinary skill in the art having benefit of the present disclosure should appreciate that this particular set of register states and state transitions depicted in FIGS. 2A and 2B is intended to be illustrative. In alternative embodiments, states representing other mappings between the architected registers 200, the physical registers 205, and the cache 210 can be used and other criteria for transitioning between the states can be defined. For example, the mappings from the architected registers 200 to the physical registers 205 and/or the cache 210 depicted in FIGS. 2A and 2B are relatively ordered and may be sequential and/or block-based. However, in alternative embodiments, other mappings can be used. For example, any of the entries in the architected registers 200 could be mapped to any entries in the physical registers 205 and/or the cache 210. In some cases, the mapping may be random or based on other criteria.

Figure 3:
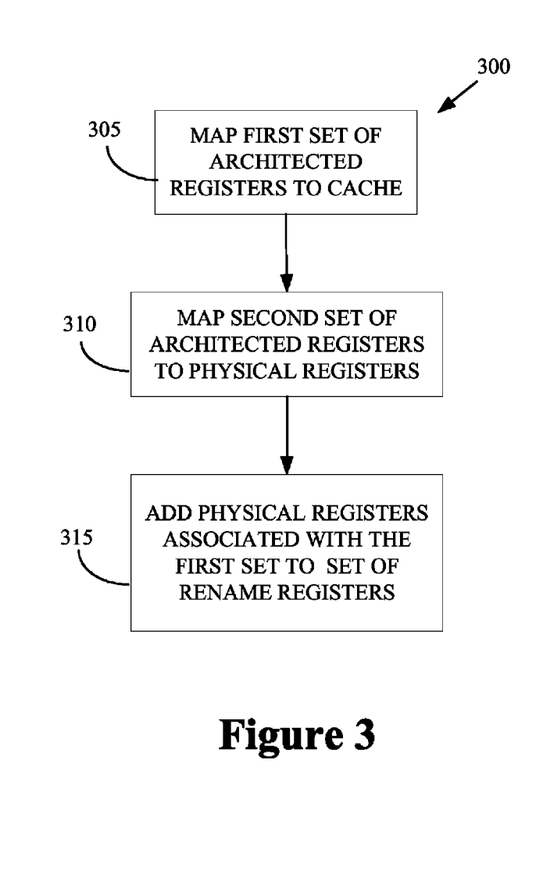
FIG. 3 conceptually illustrates a first exemplary embodiment of a method for mapping architected registers to physical registers.

FIG. 3 conceptually illustrates a first exemplary embodiment of a method 300 for mapping architected registers to physical registers. In the illustrated embodiment, the physical registers are configured so that architected registers associated with two or more different floating-point instruction sets can be mapped to the physical registers and used when the processor system is executing instructions. The physical registers also include additional entries that can be used as rename registers. The mapping can be initialized so that some of the architected registers are mapped to a memory outside of the physical registers. In the illustrated embodiment, a first set of architected registers (which are drawn from architected registers defined for a first floating-point instruction set) is mapped (at 305) to a cache that is located physically and/or logically outside of the physical registers. A second set of architected registers is mapped (at 310) to the physical registers. The unmapped physical registers that were intended to be mapped to the first set of architected registers can then be added (at 315) to the set of rename registers that are supported by the physical registers.

Figure 4:
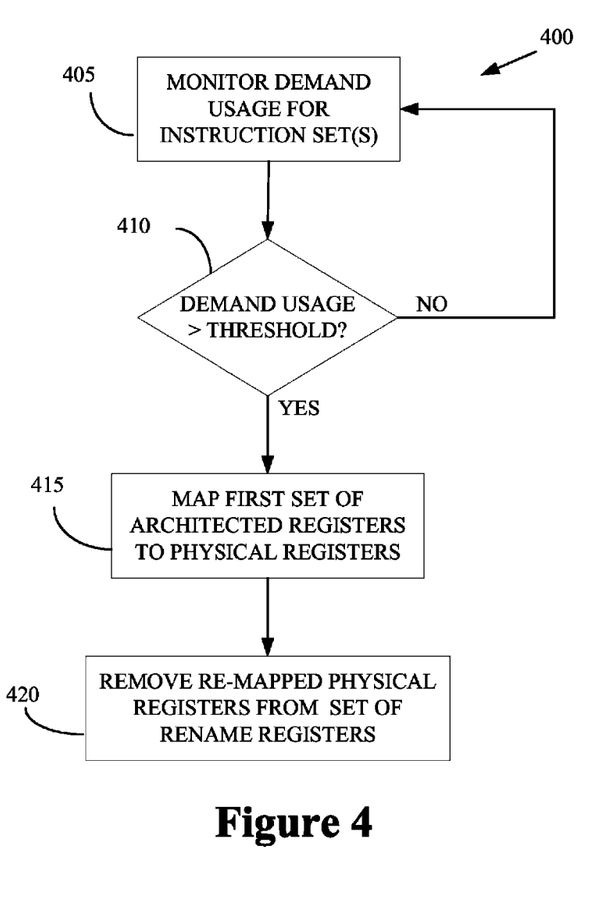
FIG. 4 conceptually illustrates a second exemplary embodiment of a method for mapping architected registers to physical registers.

FIG. 4 conceptually illustrates a second exemplary embodiment of a method 400 for mapping architected registers to physical registers. In the illustrated embodiment, a first set of architected registers has been offloaded to a memory outside of the physical registers. For example, the mapping of the architected registers may have been initialized according to embodiments of the technique depicted in FIG. 3. Demand usage for instructions defined by the different floating-point instruction sets can be monitored (at 405). As long as there is no demand for instructions in the first instruction set associated with the first set of architected registers, or the demand usage remains (at 410) below a threshold, the system may maintain the initial and/or current mapping and continue to monitor (at 405) demand usage for the different instruction sets.

The register mapping can be modified when the demand usage for instructions in the first instruction set rises (at 410) above a threshold. In one embodiment, the threshold may be set to zero so that using any instructions from the first instruction set can trigger a re-mapping. Alternatively, the threshold may be set to a non-zero number indicating a level of demand usage that triggers the re-mapping. The first set of architected registers can be mapped or re-mapped (at 415) to the physical registers when the demand usage is greater than the threshold (at 410). For example, demand usage associated with the first instruction set may trigger a fault, such as the microcode fault, that allows the architected registers to be mapped (at 415) from an external cache back to the physical registers. The contents of the architected registers that are stored in the external cache can also be written into the appropriate locations in the physical registers. The physical registers that have been mapped or re-mapped (at 415) to the first set of architected registers may then be removed (at 420) from the set of rename registers supported by the physical registers. In alternative embodiments that use a side register structure such as an E-MEM in the floating point unit, a fault or rest may not be triggered. Instead, the re-mapping (at 415) may be handled internally by the floating point architecture with less disruption. For example, a floating point unit could force a few stalls and directly copy information between the physical registers and the local side register structure.

Figure 5:
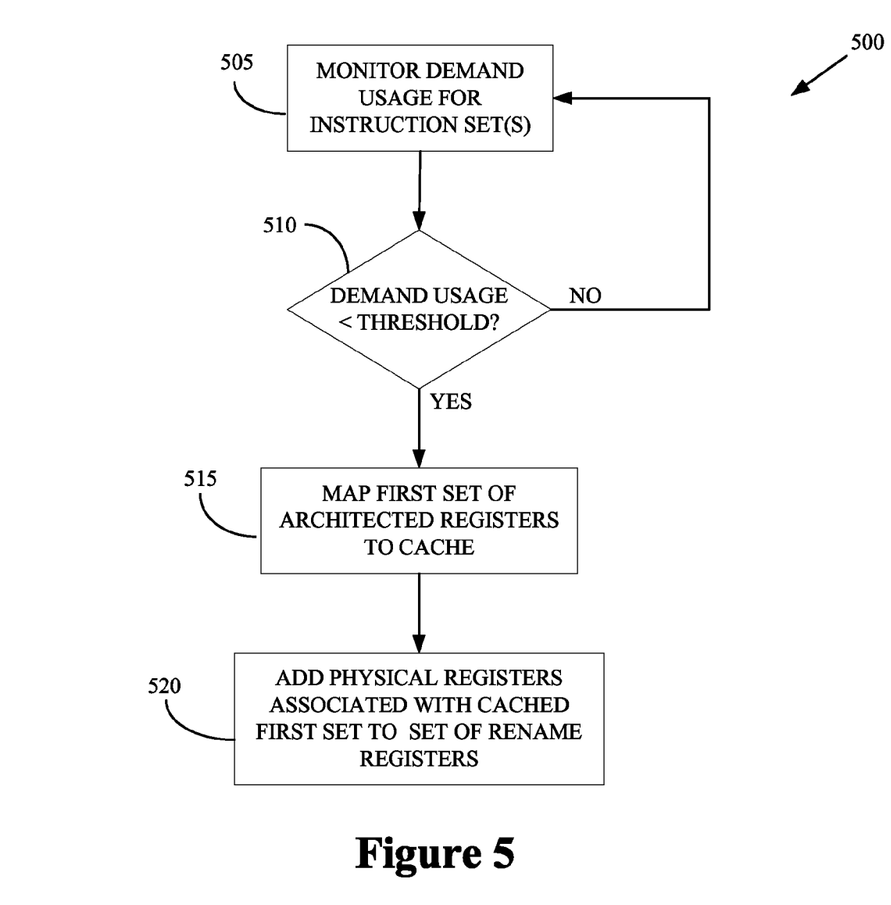
FIG. 5 conceptually illustrates a third exemplary embodiment of a method for mapping architected registers to physical registers.

FIG. 5 conceptually illustrates a third exemplary embodiment of a method 500 for mapping architected registers to physical registers. The third exemplary embodiment of the method 500 may be used independently of, in conjunction with, concurrently with, and/or in addition to the second exemplary embodiment of the method 400 depicted in FIG. 4. In the third exemplary embodiment, architected registers for two different floating point instruction sets have been mapped to the physical registers. For example, the architected registers may have been initialized according to embodiments of the technique depicted in FIG. 3 and then re-mapped to the physical registers in response to changes in demand usage as depicted in FIG. 4. However, the mapping of the architected registers to the physical registers does not have to correspond to the state discussed in FIG. 4 nor does the system have to have followed the route described in FIGS. 3-4 to arrive at a state that can utilize embodiments of the method 500. In alternative embodiments, the method 500 may be used regardless of the particular mapping of the architected registers to the physical registers.

Demand usage for instructions defined by the different floating-point instruction sets can be monitored (at 505). As long as the demand usage for instructions in the first instruction set associated with the first set of architected registers remains (at 510) above a threshold, the system may maintain the current mapping and continue to monitor (at 405) demand usage for the different instruction sets. In one embodiment, the threshold may be set to zero so that a re-mapping is triggered when the demand usage falls to zero. Alternatively, the threshold may be set to a non-zero number indicating a level of demand usage that triggers the re-mapping. In yet another alternative embodiment, the re-mapping can be triggered when the demand usage has dropped below the threshold for a selected period of time or number of cycles. For example, if a selected number of clock cycles go by (e.g., 10K cycles) and either the registers allocated to the x87 instruction set or the registers allocated to the SSE instruction set aren't being used, a fault can be forced, the registers saved out of the type that is not being used currently, and then processing may continue. However, if the floating point unit is not executing any instructions, there is no performance tradeoff and so forcing the save may not be necessary.

When the demand usage has fallen below a threshold (perhaps for a selected time interval), the first set of architected registers can be mapped (at 515) to a memory outside the physical registers, such as a cache. Information stored in the re-mapped physical registers may also be copied or written from the physical registers to the cache entries indicated by the mapping (at 515). The physical registers associated with the cached first set can then be added (at 520) to set available rename registers. Re-mapping (at 515) architected registers for the instruction set that is not being used (or is being used at a relatively low demand usage) may therefore increase the available number of rename registers, resulting in a net performance improvement for the system. For example, the out-of-order window for a processor that can perform out-of-order execution can be increased when the number of available rename registers increases.

Embodiments of processor systems that support for floating-point register caching as described herein (such as the processor system 100) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   mapping a first set of architected registers defined by a first instruction set to a memory outside of a plurality of physical registers, wherein the plurality of physical registers are configured to map to the first set of architected registers, a second set of architected registers defined by a second instruction set, and a set of rename registers, wherein the first set of architected registers are initially mapped to a cache memory outside of the plurality of physical registers;
   adding the physical registers corresponding to the first set of architected registers to the set of rename registers in response to said mapping; and
   remapping the first set of architected registers to the physical registers in response to demand usage associated with instructions from the first instructions set.

2. The method of claim 1, wherein mapping the first set of architected registers comprises initializing a mapping of the physical registers to the second set of architected registers and the set of rename registers.

3. The method of claim 1, comprising removing the physical registers corresponding to the re-mapped first set of architected registers from the set of rename registers.

4. The method of claim 1, wherein mapping the first set of architected registers to the memory comprises mapping the first set of architected registers to a cache memory outside of the plurality of physical registers.

5. The method of claim 1, wherein mapping the first set of architected registers to the memory comprises re-mapping the first set of architected registers from the physical registers to the memory in response to a decrease in demand usage associated with instructions from the first instruction set.

6. The method of claim 5, comprising re-mapping the first set of architected registers from the memory to the physical registers and removing the physical registers corresponding to the re-mapped first set from the set of rename registers in response to an increase in demand usage associated with the instructions from the first instruction set.

7. The method of claim 6, comprising mapping the second set of architected registers from the physical registers to the memory and adding the physical registers corresponding to the second set to the set of rename registers in response to a decrease in demand usage associated with instructions from the second instruction set.

8. An apparatus, comprising:
   a plurality of physical registers configured to be mapped to a first set of architected registers defined by a first instruction set, a second set of architected registers defined by a second instruction set, and a set of rename registers, wherein the first set of architected registers are mapped to a memory outside the physical registers, and wherein the corresponding physical registers are added to the set of rename registers in response to said mapping, and further wherein the physical registers are configured so that the first set of architected registers can be re-mapped to the physical registers in response to demand usage associated with instructions form the first instruction set.

9. The apparatus of claim 8, wherein the plurality of physical registers are configured to be initialized so that the physical registers are mapped to the second set of architected registers and the set of rename registers.

10. The apparatus of claim 8, wherein the physical registers corresponding to the re-mapped first set of architected registers can be removed from the set of rename registers in response to the demand usage associated with the instructions from the first instruction set.

11. The apparatus of claim 8, comprising a cache memory, and wherein the physical registers are configured so that the first set of architected registers can be mapped to the cache memory.

12. The apparatus of claim 8, wherein the physical registers are configured so that the first set of architected registers can be mapped from the physical registers to the memory in response to a decrease in the demand usage associated with the instructions from the first instruction set.

13. The apparatus of claim 12, wherein the physical registers are configured so that the first set of architected registers can be re-mapped from the memory to the physical registers in response to an increase in the demand usage associated with the instructions from the first instruction set and the physical registers corresponding to the re-mapped first set can be removed from the set of rename registers in response to the increase in demand usage associated with the instructions from the first instruction set.

14. The apparatus of claim 13, wherein the physical registers are configured so that the second set of architected registers can be mapped from the physical registers to the memory in response to a decrease in demand usage associated with instructions from the second instruction set and the physical registers corresponding to the second set can be mapped to the set of rename registers in response to the decrease in the demand usage associated with the instructions from the second instruction set.

15. A non-transitory computer readable media including instructions that when executed can configure a manufacturing process used to manufacture a semiconductor device that comprises:
   a plurality of physical registers configured to be mapped to a first set of architected registers defined by a first instruction set, a second set of architected registers defined by a second instruction set, and a set of rename registers, wherein the first set of architected registers are be mapped to a memory outside the physical registers, and wherein the corresponding physical registers are added to the set of rename registers in response to said mapping, and further wherein the physical registers are configured so that the first set of architected registers can be re-mapped to the physical registers in response to demand usage associated with instructions form the first instruction set.

16. The non-transitory computer readable media set forth in claim 15, wherein the computer readable media is configured to store at least one of hardware description language instructions or an intermediate representation of the plurality of physical registers.

17. The computer readable media set forth in claim 16, wherein the instructions when executed configure generation of lithography masks used to manufacture the plurality of physical registers.

18. An apparatus, comprising:
a floating point unit configured to perform mathematical operations on floating point numbers;
a plurality of physical registers implemented in the floating point unit and configured to store floating-point numbers; and
a memory outside of the physical registers, the memory being configured to store floating-point numbers, wherein a first set of architected registers defined by a first instruction set, a second set of architected registers defined by a second instruction set, and a set of rename registers can be mapped to the plurality of physical registers, and wherein the first set of architected registers are mapped to the memory outside the physical registers, and wherein the corresponding physical registers are added to the set of rename registers in response to said mapping, and further wherein the physical registers are configured so that the first set of architected registers can be re-mapped to the physical registers in response to demand usage associated with instructions form the first instruction set.

19. The apparatus of claim 18, wherein the memory is a cache memory.

20. The apparatus of claim 18, comprising at least one processor core, and wherein the floating-point unit is implemented in said at least one processor core, and wherein the memory is an emulated memory implemented by said at least one processor core.

\* \* \* \* \*

UNITED STATES PATENT AND TRADEMARK OFFICE
CERTIFICATE OF CORRECTION

PATENT NO. : 9,626,190 B2
APPLICATION NO. : 12/900124
DATED : April 18, 2017
INVENTOR(S) : Jeff Rupley It is certified that error appears in the above-identified patent and that said Letters Patent is hereby corrected as shown below:

In the Claims

Column 11, Line 22, please change "registers are" to -registers is-.

Column 11, Line 26, please change "registers are" to -registers is-.

Column 11, Line 32, please change "response to demand usage" to -response to the demand usage-.

Column 11, Line 33, please delete "the first instructions set" and substitute -the first instruction set-.

Column 11, Line 48, please change "decrease in demand" to -decrease in the demand-.

Column 11, Line 55, please change "increase in demand usage" to -increase in the demand usage-.

Column 11, Line 61, please change "decrease in demand usage" to -decrease in the demand usage-.

Column 12, Line 8, please change "to demand usage" to -to the demand usage-.

Column 12, Line 35, please change "increase in demand usage" to -increase in the demand usage-.

Column 12, Line 40, please change "decrease in demand usage" to -decrease in the demand usage-.

Column 12, Line 55, please delete "are be mapped to a" and substitute -are mapped to a-.

Column 12, Line 61, please change "response to demand usage" to -response to the demand usage-.

Column 12, Line 62, please change "instructions form the" to -instructions from the-.

Column 13, Line 18, please change "are mapped to" to -is mapped to-.

Signed and Sealed this
Eighth Day of October, 2019

Andrei Iancu
*Director of the United States Patent and Trademark Office*

CERTIFICATE OF CORRECTION (continued)
U.S. Pat. No. 9,626,190 B2

Column 13, Line 24, please change "response to demand usage" to -response to the demand usage-.

Column 13, Line 25, please change "instructions form the" to -instructions from the-.